United States Patent Office
3,689,277
Patented Sept. 5, 1972

3,689,277
PREPARATION OF A CARAMEL FLAVORED
PROTEIN HYDROLYSATE
Michael R. Sfat and Bruce J. Morton, Manitowoc, Wis., assignors to Bio-Technical Resources, Inc., Manitowoc, Wis.
No Drawing. Filed May 5, 1970, Ser. No. 34,883
Int. Cl. A23l 1/00; A23j 1/14; C12c 9/00
U.S. Cl. 99—28
9 Claims

ABSTRACT OF THE DISCLOSURE

A protein hydrolysate of enhanced organoleptic properties is produced by heating a granular intimate mixture of a protein hydrolysate and a sugar in the presence of moisture at a temperature of about 75–100° C. until a caramel flavor is imparted to the mixture. The product is useful as a flavor precursor for a fermented alcoholic beverage, particularly beer, and as a food supplement or ingredient. The product may be incorporated in a fermentation wort for producing a fermented alcoholic beverage, and when produced employing a highly fermentable sugar, provides a wort yielding a low carbohydrate beverage. Preferred products may serve as a malt flavor base in foodstuffs, particularly non-alcoholic beverages.

BACKGROUND OF THE INVENTION

This invention relates to a process for enhancing the organoleptic properties of a protein hydrolysate, to the product thereof, and to the use of such product in the production of beverages, including fermented alcoholic beverages, particularly beer, and non-alcoholic beverages.

In the field of nutrition, the lack of palatability is presently one of the greatest technical problems confronting workers who can otherwise produce nutritionally desirable protein hydrolysates for human consumption. Flavor acceptance for such products would create additional sources of high quality protein foods.

In the production of beverages, the brewing of beer classically is a process involving the alcoholic fermentation of an aqueous extract of germinated cereals, particularly barley, with the addition of hops. Barley grain gives a poor fermentable extract, and an unsatisfactory starch paste is obtained when it is mashed with hot liquor. The grain must, therefore, first be germinated to set free amylolytic enzymes which attack and hydrolyze the starch of the endosperm to soluble sugars at mashing. The germination is termed malting, and the germinated and kilned product is termed malt. The malt is ground and extracted with hot liquor to hydrolyze the dry matter to soluble sugars, producing an aqueous extract termed the wort. Part of the malt may be replaced by non-germinated cereals, especially rice and corn flour, technically known as raw grains, or sugars may be added to the wort. The wort is boiled with hops, cooled, and pitched with yeast for fermentation to beer.

The production of malt requires large production and storage facilities, and considerable time is required for the process of germinating the grain. It is apparent that plant capacity could be greatly reduced by reducing or eliminating the need for malt in brewing beer and like alcoholic beverages. Various efforts have been made in this direction, without great success. Beer is still produced for the most part by the classical methods involving the use of malt. While plant capacity has been reduced with increasing utilization of adjuncts in the wort, for supplying carbohydrates, extensive malting facilities continue to be required.

Beer as brewed according to the classical methods contains a substantial proportion of carbohydrates, which constitute the real extract less the protein content of the beer. The carbohydrate content of the beer represents unfermentable substances which were present in the fermentation wort, and which were extracted from the malt in mashing and may also have derived from adjuncts incorporated in the mash. The extraction of malt according to the classical methods results in the presence of a substantial proportion of unfermentable dextrins. Consequently, standard beers brewed according to classical methods have a carbohydrate to protein weight ratio of about 11 to 1 and a caloric content commonly on the order of 150 calories and higher per 12 fluid ounces.

Several procedures have been proposed for producing a low carbohydrate beer, and, in general, the beers may contain as much as one-third less total calories than standard beers having the same alcohol and protein content. Those procedures resulting in the production of commercially acceptable beers also are based upon the extraction of malt to provide the beer flavor precursor. Consequently, the production capacity and time requirements for malting remain.

In our copending U.S. patent application Ser. No. 31,415 filed Apr. 23, 1970, for "Production of a Vegetable Protein Hydrolysate and of a Fermented Alcoholic Beverage Therefrom," we have disclosed the production of a concentrated protein hydrolysate that is especially valuable as a flavor precursor for a fermented alcoholic beverage, particularly beer, and is also valuable as a food supplement or ingredient. In the invention described therein, a concentrated vegetable protein hydrolysate substantially free of starch is produced by a process which includes treating a starchy proteinaceous cereal grain product in aqueous medium with added proteolytic enzyme in the absence of substantial added amylolytic enzyme to produce a solution containing soluble protein hydrolysis products together with a starchy carbohydrate fraction, separating the solution from undissolved residue, and treating the separated solution with added amylolytic enzyme to produce a substantially starch-free solution.

Inasmuch as the product of the foregoing process is free of starch, it furnishes a very desirable fermentable extract, without the unsatisfactory starch paste obtained in mashing with hot liquor in the earlier attempts to employ a grain extract. The product may serve to eliminate malt from the brewing process, completely or partially as may be desired, with corresponding reduction in the requirements for malting capacity. The product has a high protein, low carbohydrate content, including but a low proportion of unfermentable carbohydrates which were extracted from the grain. Its composition enables independent control of the protein and carbohydrate components of fermentation worts and the fermented beverages. The haze and flavor stability of the fermented beverages are from very good to excellent.

Beers of either standard carbohydrate content or low carbohydrate content, having various desired protein levels, may be produced employing the concentrated protein hydrolysate product of the aforesaid process, with or without malt. The beers produced without malt have, in general, winey characteristics in various degrees. While the beers are palatable beverages which will be acceptable to many persons, they are less desirable for the general market in this respect than standard beers. Such characteristics are, however, not noticeable where malt is employed therewith, e.g., on a half and half basis as regards the protein content. The winey characteristics also are less noticeable where the real extract of the beer corresponds to a standard beer, rather than the low value of a low carbohydrate beer. Certain of the beers, particularly the low carbohydrate beers, may be lacking in the taste characteristic of fullness. Also, the caramel aroma of a standard beer is lacking, although this may be supplied by the addition of caramel.

It would be advantageous to enhance the organoleptic characteristics of the aforesaid concentrated protein hydrolysate product, so as to increase its acceptability and utilization for nutritional purposes. It would be especially desirable to provide an improved product which might be employed to produce beers comparable in all respects to conventional beers. In particular, it would be desirable to impart malt-like flavor and aroma to the hydrolysate product for such purpose. The malt-like properties also would provide a malt flavor base for foodstuffs, particularly non-alcoholic beverages.

SUMMARY OF THE INVENTION

The present invention provides a process for enhancing the organoleptic properties of protein hydrolysates produced according to the above-identified co-pending application and in other ways, which results in novel products useful as foodstuffs or ingredients of food products, including nonalcoholic beverages, and for making fermented alcoholic beverages.

In the invention, a granular intimate mixture of a protein hydrolysate and a sugar is heated in the presence of moisture at a temperature of about 75–100° C. until a caramel flavor is imparted to the mixture. Depending upon the extent of the heat treatment, more or less of the caramel flavor is imparted, as may be desired for the intended use of the product.

In a preferred embodiment of the heat treatment process, the protein hydrolysate is intimately mixed with a sugar in the presence of sufficient water to provide a moist granular mixture, the mixture is dried to remove surface moisture, and the mixture is heated at the aforesaid temperature until the caramel flavor is imparted to the mixture.

The invention also provides a process for producing a fermented alcoholic beverage, wherein the product of the heat treatment process is incorporated in a fermentation wort. The product of heat treatment supplies the protein requirements and serves as a flavor precursor for the beverage, and also supplies part or all of the carbohydrate requirements for fermentation, in the production of a normal bodied or a low carbohydrate beverage.

In a further preferred embodiment of the heat treatment process, the protein hydrolysate employed in the process is produced according to the process of our aforesaid co-pending application. The products resulting from such embodiment are preferred for fermentation, as they yield high quality standard and low carbohydrate beverages. The products are nutritious, very palatable compositions of soluble proteins and carbohydrates which are useful for various food purposes, including the production of non-alcoholic beverages.

The preferred product of the present invention provides all of the advantages in brewing that are achieved with the protein hydrolysate product of the aforesaid copending application, and in addition, the organoleptic characteristics of the beverage are significantly improved. Thus, beers of standard carbohydrate content may be brewed without malt which are indistinguishable from corresponding beers brewed from malt. The low carbohydrate beers have better flavor and fullness characteristics than prior low carbohydrate beers, and there is no problem of stability. The beers have no winey characteristics, and they have the distinctive caramel aroma of malt beers.

A low carbohydrate alcoholic beverage as contemplated by the invention will have a carbohydrate to protein weight ratio below about 5½ to 1. Preferably, the ratio is maintained below about 4 to 1, and can be reduced to as low as about 3 to 1. As noted above, the carbohydrate to protein weight ratio in standard U.S. beers generally is about 11 to 1 at the present time.

The preferred product of the invention is very desirable for incorporation in a non-alcoholic beverage as a malt flavor base. When used for making malted milk, the product produces a flavor superior to that resulting from the use of ordinary malted milk products, including better after-taste characteristics and less grainy qualities. The product may be used to prepare malt-flavored soft drinks, with additional flavors superimposed thereon if desired, which are very appetizing and have none of the characteristic "wet wool" aroma associated with this type of product when prepared from a malt base.

DESCRIPTION OF THE PREFERRED EMBODIMENTS

In the invention, a granular intimate mixture of a protein hydrolysate and a sugar is subjected in the presence of moisture to a heat treatment or toasting process for enhancing the organoleptic properties of the protein hydrolysate. The properties of protein hydrolysates from various sources, both animal and vegetable, may be enhanced by the process of the invention. Vegetable seeds, especially the cereal grains and legumes, represent abundant and very desirable sources of protein, and proteins from such sources therefore are preferred for supplying the protein hydrolysate. Further preferred sources of all-purpose protein hydrolysates are the cereal grains, more preferably, barley, wheat, oats and rye. Enzymatic hydrolysates are preferred, inasmuch as they are produced free of salts which result from other types of hydrolysis.

The protein source preferably is treated or extracted in aqueous medium with added proteolytic enzyme to produce a solution containing soluble protein hydrolysis products. Where the protein is accompanied by a substantial amount of starchy carbohydrate, as in most of the grains and legumes, a proteolytic enzyme is employed in the absence of substantial added amylolytic enzyme, to minimize the extraction of carbohydrate.

When employing a cereal grain, it is preferred to employ the whole grain, for availability and production reasons. While either a hulled or dehulled grain may be employed, it has been noted in the case of barley that a beer of improved graininess is produced from the grain having the hull intact.

Photeinaceous fractions of the cereal grains and legumes may be employed, such as are obtained as by-products in milling and extraction operations. For example, defatted soy flour is a very useful high protein product obtained from soybeans. Barley pearlings are high protein by-product fractions which have been found to be good sources of protein hydrolysate. The pearlings consist primarily of the aleurone fraction of barley. High protein wheat flour is another example of a good source of protein hydrolysate.

The grain or legume preferably is finely divided or ground for hydrolysis. Thus, a fine grind is preferred, rather than a coarse grind, as those terms are employed in the brewing industry. More particularly, it is preferred that at least about 99% of the finely divided material have a particle size below about 1 millimeter, i.e., passing through a U.S. Sieve Series No. 18 sieve, having a sieve opening of 1 millimeter. A fine grind provides greater extractability of protein, e.g., as much as twice as great as with a coarse grind.

The finely divided grain or legume is mixed with water, and a proteolytic enzyme is added to the mixture for hydrolysis and solubilization of the protein. It was found that when more than an appreciable amount of amylolytic enzyme was added to a starch-containing grain or legume, the protein content of the product decreased and the carbohydrate content increased markedly. In the preferred practice, the protein hydrolysate product solids contain at least about 40% protein by weight of the solids, thereby providing the desired concentration for independent control of the protein and carbohydrate components of the fermentation wort in beer making, and also providing low carbohydrate product for the heat treatment and other purposes.

The proteolytic enzyme preferably is employed as a concentrate or isolate from natural sources, and may actually constitute a mixture of proteolytic enzymes. Numerous products are available, and, depending upon their source, they may include amylolytic enzyme. The products employed have from low amylolytic enzyme content to no amylolytic enzyme content. They are also referred to in the trade as having relatively low diastatic activity. Such products may have less than about 1,000 starch liquefying units and less than about 200 starch dextrinization units (SKB), per gram. (An enzyme with 1,000 starch liquefying units per gram will reduce the viscosity of 300 times its weight of potato starch by 90% in ten minutes at 70° C. and pH 6.7. The starch dextrinization units represent the number of grams of beta-amylase treated soluble starch dextrinized by 1 gram of enzyme in one hour at 30° C. and pH 4.85.)

The preferred proteolytic enzymes are substantially pure isolates, i.e., substantially free of amylolytic enzyme, and include papain, bromelain, and ficin. Commercial papain is a mixture of at least two types of proteolytic enzymes derived from papaya, and it is activated by reducing agents such as bisulfites. Bromelain is a mixture of proteolytic enzymes derived from the pineapple plant. Ficin is a mixture of proteolytic enzymes obtained from the latex of the fig tree, and it is activated by reducing agents including bisulfite. The enzyme products are free of amylolytic activity. Protein hydrolysates containing as much as 62% or more protein may be produced from whole grains employing such enzymes.

Proteolytic enzyme products having high proteolytic activity and low amylolytic activity also may be employed, but generally produce lower concentrations of protein from grain or legumes, near the desired lower limit of 40% protein. For example, Rhozyme P-11 and Rhozyme 41 (Rohm and Haas) may be employed to produce concentrates from barley containing up to about 45% of protein. Various other proteolytic enzymes may be employed as well.

A catalytic amount of a proteolytic enzyme is reacted with the protein source at a pH preferably in the optimum range for the enzyme. It has been found that, in general, an amount of the enzyme in the range of about 0.1–1% (pure proteolytic enzyme basis) by weight of the protein content of a seed product will produce the desired protein hydrolysis. Optimum activity of the enzyme generally will be exhibited in a pH range of about 4 to 9, more specifically, about 5 to 8. Thus, papain is employed herein at a preferred pH of about 6.5–7. Ficin is employed at a preferred pH of about 5.5 to 7.5. Bromelain is employed at a preferred pH of about 5.5–7.0. Rhozyme P-11 and Rhozyme 41 are employed at a pH in the range of about 6 to 9.

The proteolytic enzyme treatment of a seed product preferably is conducted at a temperature of about 35–50° C., for generally optimum hydrolysis of protein and minimum extraction of carbohydrate. The treatment is continued for about one-half to six hours, varying inversely with the temperature. The lower temperatures may require a greater treatment time, and for that reason, are less desirable.

As noted above, the proteolytic enzyme treatment preferably is conducted in the foregoing manner so as to obtain an hydrolysate or extract solution containing at least about 40% protein by weight of the solids content thereof. This condition is achieved by appropriate selection of seed product fraction, proteolytic enzyme and amount, absence of amylolytic enzyme, pH adjustment for the proteolytic enzyme, and treatment temperature and time. The yield of protein from the cereal grains, in general, ranges upwards from 60% by weight of the total grain protein under preferred conditions, the yield varying with the proteolytic enzyme employed for hydrolysis. The yield from whole grain is about 65% to 97% (protein values referred to herein are calculated as 6.25×Kjeldahl nitrogen).

The proteolytic enzyme treatment of the aqueous dispersion of the seed product hydrolyzes the seed protein to soluble hydrolysis products, and also results in the extraction of a starchy carbohydrate fraction from the seed product when starch is present. The extracted starch would interfere with brewing a satisfactory alcoholic beverage, and it causes the formation of a viscous gel if the solution is concentrated beyond about 33% solids.

The starch content of the solution resulting from such proteolytic enzyme treatment is hydrolyzed by treating the solution with added amylolytic enzyme. It has been found that treatment of such solution in the presence of the undissolved residue results in further extraction of carbohydrate, reducing the protein concentration. Separation of the solution from undissolved residue followed by amylolytic enzyme addition and treatment of the separated solution avoids additional carbohydrate extraction and provides for rapid and complete or substantially complete hydrolysis of starch, as determined by the starch-iodine test. The resulting solution or the solids content thereof then may be employed for brewing, and it may be concentrated to a solids content in excess of about 40% by weight.

The amylolytic enzyme may be supplied by any of numerous enzyme-containing materials, including natural sources and isolates or concentrates therefrom. The presence of other enzymes is, in general, not a significant factor. Thus, enzyme products containing substantial proteolytic enzyme activity in addition to amylolytic activity may be employed, and the proteolytic enzymes may serve to provide additional hydrolysis of the soluble protein hydrolysis products of the proteolytic enzyme treatment. However, the presence of a proteolytic enzyme is optional.

The starch-containing solution may be treated with amylolytic enzyme which is naturally occurring or developed, as in malted grain. For example, a small amount of a distillers malt high in amylolytic activity may be employed, such malt being produced as described in U.S. Patent No. 3,116,221 to Sfat et al. Such a treatment is advantageous when the product is intended for the production of beer, the flavor being improved as compared to other enzyme treatments.

Frequently, it will be preferable to employ an enzyme isolate or concentrate, which is commercially available, for simplicity and economy. Enzyme isolates which may be employed include, for example: HT Proteolytic (Miles Laboratories), produced by *B. subtilis;* Takamine Acid Fungal Protease (Miles Laboratories); and Rhozymes (Rohm and Haas), derived from *A. oryzae*, including Rhozyme J-25 and Rhozyme A-4. Another suitable product is Nervanase 10X (A.B.M. Industrial Products Ltd.), a bacterial alpha-amylase. Various other preparations containing amylolytic activity may be employed as well.

The amylolytic enzyme is added to the separated proteolytic enzyme hydrolysate solution in a catalytic amount In general, an amount of the enzyme providing in the range of about 250–1000 DNS units per gram of the carbohydrate content of the hydrolysate solution will hydrolyze the starch content of the solution (DNS units are described in Example 1, hereinafter). It has not been found necessary to adjust the pH of the separated solution for amylolysis, although if desired, the pH may be adjusted to the optimum range for the particular amylolytic enzyme, generally in the pH range of about 4–8.

The amylolysis may be conducted at a temperature in a relatively wide range of about 37–75° C., so long as the enzyme is stable. Preferably, the temperature is about 45–65° C. The hydrolysis of starch is completed in about one-half to six hours, varying inversely with the temperature.

As noted above, the solution initially resulting from the foregoing proteolytic and amylolytic enzyme treatments is concentratable without gelling. The solution may be concentrated to a preferred solids content of about 40% by weight or greater for use in the subsequent flavor and aroma enhancing treatment. Such concentration may take place in a conventional evaporator operating under vacuum or subatmospheric pressure, at a temperature of about 35 to 55° C. The solution may be concentrated to a useful solid by spray drying.

In accordance with the invention, a protein hydrolysate obtained as described above, or in other manner appropriate for the protein source, is intimately mixed with a sugar and sufficient water top rovide a moist granular mixture. The water may be provided by a concentrated solution of the hydrolysate or by a sugar syrup, and/or may be added to relatively dry hydrolysate and sugar materials. Preferably, the mixture is sufficiently moist to insure that the hydrolysate and the sugar adhere to each other in fine granules, requiring preferably about 10–25% of water in mixture, as based upon the total wet weight of the mixture, the amount depending upon the character of the materials. Where concentrated hydrolysate solutions are employed, the solutions are concentrated sufficiently to provide the desired moist granular mixture when mixed with commercial granular sugar.

The sugar may be a mono- or disaccharide suitable for the intended use of the product, such as glucose (dextrose), sucrose, lactose and maltose. Where the product is intended for use in a fermentation wort, glucose and sucrose are preferred, inasmuch as they are highly fermentable sugars. This is especially the case when the toasted product is intended for use in the production of a low carbohydrate alcoholic beverage. The term "highly fermentable" refers to sugars capable of at least 90%, preferably at least 95% fermentation by brewers yeast and conversion to alcohol.

The weight ratio of sugar to protein in the mixture preferably is at least about 0.5:1. When employing cereal grain protein hydrolysate, a minimum sugar to protein ratio of about 2:1 is preferred. Ratios up to about 25:1 are desirably employed when the product is intended for use in a fermentation process. The sugar content of the protein hydrolysate is included in the sugar proportion. It will constitute about 40–50% of the carbohydrates which accompany the soluble proteins in the hydrolysate, in the case of extraction from cereal grain. The lower sugar proportions are preferable for minimizing the carbohydrate content of the toasted product and at times for cost considerations. The higher sugar proportions serve to tailer the product to specific uses, especially in fermentation and food applications.

The protein hydrolysate and the sugar are employed in finely divided form, as granules or powder, or one of them may be employed in a solution or syrup, so as to provide a moist granular intimate mixture of the two when mixed in the presence of water. For effective heat treatment, a moisture content is necessary, it appearing that the moisture serves to effect molecular association of the soluble sugar and protein molecules and/or catalysis for reaction therebetween. At the same time, it is necessary to reduce the moisture content below the level at which a sticky mass would be formed upon heating, which is inoperative to produce the desired result. Consequently, the moist mixture is dried sufficiently after mixing to remove surface moisture, so that it is dry to the touch, and will not develop a stickiness or syrupy condition upon heating to treatment temperature. The desired condition at treatment temperature is that of a soft pliable or spongy mass, resembling brown sugar at room temperature, not clinging to the finger yet not dry like granulated sugar (sucrose). The moisture content after drying the moist granular mixture to prepare it for heat treatment will vary, depending upon the nature and proportions of the hydrolysate and sugar materials, and the absorbency of the mixture. In general, the moisture content will be in the range of about 7–20% by weight of the mixture. After drying the mitxure, it is preferable to break up any agglomerates that formed.

The mixture thus prepared is heated to a bed temperature of about 75–100° C., preferably 80–85° C., and maintained at such temperature to lightly toast the mixture. The preferred method of heating is to conduct heated air at the desired or a slightly higher temperature through the mixture. Upon reaching the desired bed temperature, the mixture is held thereat until a very faint or slight caramel flavor is imparted thereto, when the toasted product is intended for brewing. When the mixture is heated at 80–85° C., about 20–45 minutes at such temperature generally is required. During such heating, the moisture content of the mixture is lowered to about 2–10% by weight of the mixture.

Additional heating will produce more of a carmel flavor in the toasted product, which is desirable for malt-flavored non-alcoholic beverages such as malted milk and soft drinks, and will also produce a beer having taste characteristics like bock beer when used for brewing at full strength. Alternatively, such toasted product may be blended with untoasted protein hydrolysate in a fermentation wort, to produce a beer having the taste of regular beer. The heating period for a stronger caramel flavor may be, for example, ½–4 hours at 80–85° C.

The toasted product is rapidly cooled to about 38° C. or lower, preferably by circulating air at ambient temperature. The toasted product is free-flowing, having the consistency of granular sugar. The product from cereal grain protein is cream-colored and has a taste resembling honey.

The products produced employing the several types of protein hydrolysates may be used for various food purposes, especially as protein supplements and/or malt flavor bases, and for the production of fermented alcoholic beverages. The products obtained employing the preferred protein hydrolysates according to our aforesaid copending application are especially advantageous for producing fermented alcoholic beverages and non-alcoholic beverages.

A toasted product may be incorporated in a fermentation wort for the production of an alcoholic beverage, particularly a beer, in which it may supply all or any part of the protein requirements for the beverage. It is a unique advantage of the invention that the product may supply all of the protein requirements, with no use of malt, and produce a standard or a low carbohydrate beer of most desirable quality. All requirements for malting may be eliminated, and beer may be produced entirely from protein hydrolysate and appropriate brewing adjuncts supplying the necessary additional carbohydrate. The protein content of the beer may be adjusted as desired.

In view of the low unfermentable carbohydrate content of the protein hydrolysate, and with the use of a highly fermentable sugar for producing the toasted product, a good quality low carbohydrate alcoholic beverage may be produced merely by mixing the product with water, to provide a wort low in unfermentable carbohydrates, and hopping and fermenting the wort following conventional procedures. If needed for alcohol production, additional highly fermentable sugar may be incorporated in the wort. Glucose and sucrose are preferred additives to the wort in this case, and it is contemplated that another mono- or disaccharide having the requisite fermentability, alone or in admixture with another sugar, might be employed.

The toasted product of the invention may be incorporated in a fermentation wort to produce a beer having a carbohydrate caloric content, i.e., exclusive of alcohol and protein, of less than about 1.1 calories per ounce, as calculated on the basis of 1.19 calories per ounce for each 1% of real extract carbohydrate. Such caloric content is highly desirable to the ultimate consumer and, in general, may provide as much as ⅓ less total calories than regular beers having the same alcohol and protein content.

In practice, the quantity of toasted product for producing a beer of a given protein content is determined. Beer protein may range from about 0.15 to 0.4% by weight, with about 0.25 to 0.3% generally preferred. If necessary, adjunct is added to that quantity of the product in an amount sufficient, together with the fermentable portion of the product carbohydrate, to yield the desired alcohol content in the beer. The alcoholic content of U.S. beer will fall in the range of about 2.8–4%, and may increase to 5% in malt liquor and ale. Alternatively, a portion of the protein requirements may be supplied by the protein hydrolysate of our aforesaid copending application.

After suitable dilution with brewing water, the resulting wort is boiled with the addition of hops, and strained, cooled, and again adjusted with brewing water, all in a conventional manner, to provide a wort ready for fermentation. Thus, for example, the wort is brought to a boil and boiled for about 1½ to 2 hours during which hops are added at the normal rate, the hops are strained out, the wort is cooled to about 20° C. and diluted with brewing water to the desired concentration, and the wort is finally cooled to about 8–14° C. The wort then is ready for fermentation with brewers yeast.

The wort prepared according to the invention is fermented in a conventional manner: The wort is pitched with brewers yeast and fermented for about 5–14 days at a temperature of about 8–14° C. The beer product is finished in a conventional manner, as by transferring it to storage tanks for up to about 2 months, filtering, chill-proofing, carbonating, bottling and pasteurizing.

The toasted product is free of enzymes which can impair the flavor of the beer. The beer has from very good to excellent haze and flavor stability. The invention is especially significant for fermentation by a bottom fermentation process, which is illustrated herein. The invention is also applicable to fermentation by top fermentation processes, wherein the toasted product may be employed to supply the protein requirements together with carbohydrate low in unfermentable materials.

The toasted product may be incorporated in a nonalcoholic beverage as a malt flavor base, in any desirable proportion. As noted above, the product toasted to a slightly greater extent is preferred for this purpose. Thus, for example, the product alone furnishes a desirable malt-flavored soft drink when mixed with water. Additional flavoring materials may be added thereto, as desired. The product may serve as the source of malt flavor in malted milk prepared in an otherwise conventional manner.

The following examples illustrate various embodiments of the invention, including the production of protein hydrolysates having enhanced organoleptic properties, and the production of fermented alcoholic and non-alcoholic beverages therewith. The examples also illustrate the production of protein hydrolysates which are treated in accordance with the invention. It will be understood that the invention is not limited to the examples or to the materials, conditions, proportions and procedures set forth therein, which are merely illustrative. In the examples, all proportions are by weight.

Example 1

The following illustrates a preferred procedure for producing a cereal grain protein hydrolysate which when treated according to subsequent examples yields an organoleptically superior product:

A 2,000 gram quantity of hull-containing barley whole grain containing about 13.5% protein is ground at the No. 1 setting on a Labconco Laboratory Mill, providing a particle size distribution, percent retained on the U.S. Sieve Series sieve number indicated: No. 18, 0.2%; No. 30, 16.7%; No. 60, 59%; No. 100, 18.5%; through No. 100, 5.6%.

The ground grain is added to 10 liters of water, made up of 9 liters of tap water and one liter of brewing water containing 240 p.p.m. calcium sulfate, 100 p.p.m. sodium chloride, and 55 p.p.m. magnesium sulfate. After mixing, the pH is adjusted to about 6.6–6.7 by the addition of about 15 ml. of 15% sodium hydroxide.

As a source of proteolytic enzyme, 4 grams of standardized papain (S. B. Penick & Co., having 0.2 Penick milk clot units per gram) is added to the mixture, with 5 grams of potassium metabisulfite enzyme activator, and the mixture is maintained at 45° C. with stirring for 4 hours. The mixture is stored overnight at 0° C. and decanted.

The clear decanted solution is treated with a source of amylolytic enzyme, either Takamine acid fungal protease or HT Proteolytic enzyme. The materials employed herein had the following enzyme activities:

|  | Amylolytic activity, DNS units/gm. | Proteolytic activity, Colorimetric Northrop units/gm. |
| --- | --- | --- |
| Takamine acid fungal protease | 42,000 | 21,000 |
| HT Proteolytic enzyme | 97,000 | 1,000 |

DNS units are determined according to the colorimetric method described in "Methods in Enzymology," vol. 1, p. 149 (1955, Academic Press, Inc., N.Y.). The conversion of starch to maltose is measured colorimetrically, employing dinitrosalicyclic acid as the coloring agent. A 10 mg. sample of soluble starch is converted to 0.4 mg. of maltose hydrate in 5 minutes at 37° C. for each unit of activity. Colorimetric Northrop units are determined according to assay No. 10-313 of Marschall Division, Miles Laboratories.

The enzyme source is added in a quantity of 0.2 gram per liter, and the solution is maintained at 45° C. with stirring for 2 hours. The resulting solution is starch-free by the starch-iodine test. It contains about 4.4 to 4.8% solids including about 2.2 to 2.4% protein. The protein recovery from the grain is about 75 to 85%.

Solutions produced in the foregoing manner may be concentrated in a circulating evaporator at temperatures in the range of 35–55° C. and under a vacuum of 27 inches of mercury (3 inches pressure) to solids concentrations in the range of 50–55% by weight, and concentrations up to about 65% can be obtained if desired. The protein content of the solids in such solutions is about 45–50% by weight of the solids.

In place of the papain and potassium metabisulfite, the following proteolytic enzymes may be employed: Rhozyme 41, 8 grams; Rhozyme P–11, 8 grams; ficin (Miles Laboratories), 4 grams; and Collupulin (Wallerstein Co.), 4 grams. Rhozyme 41, derived from *A. oryzae*, typically contains about 50,000 hemoglobin units (HU) and 7500 casein solubilization units, together with about 75 starch liquefying units and about 30 starch dextrinization units, per gram. Rhozyme P–11 contains about 40,000 hemoglobin units and 10,000 casein solubilization units, together with about 850 starch liquefying units and about 150 starch dextrinization units, per gram. (An enzyme has an activity of 1,000 hemoglobin units per gram when 11.18 mg. of the enzyme produces an increase in soluble nitrogen of 5.00 mg. from 0.417 gm. of hemoglobin in 5 hours at 40° C. and pH about 8.0. An enzyme with an activity of 1,000 casein solubilization units per gram will solubilize nine times its weight of casein in one hour at 40° C.). Ficin (Miles) contains 1200 colorimetric Northrop units per gram.

In place of the acid fungal protease or HT Proteolytic enzyme, 0.2–0.3 gram per liter of the following enzymes or enzyme mixtures having amylolytic activity may be employed: Rhozyme J-25, Rhozyme A-4, and Nervanase 10X. Rhozyme J-25 typically contains about 17,600 starch liquefying units, 8,000 starch dextrinization units, 37,000 hemoglobin units, and 2,250 casein solubilization units per gram. Rhozyme A-4 typically contains about 9,500 starch liquefying units, 3,500 starch dextrinization units, 50,000 hemoglobin units, and 2,000 casein solubilization units per gram. Nervanase 10X contains about 30,000 DNS units per gram.

Alternatively, barley malt having an alpha-amylase activity of about 40 dextrinizing units (D.U.) per gram (A.S.B.C. Methods of Analysis) or higher may be employed for amylolysis, at a rate of about 5–10% by weight of the solids content of the solution. The malt treatment is followed by filtration, to remove the malt residue.

Example 2

A concentrated protein hydrolysate solution was produced from whole barley grain in the manner of Example 1, employing 70 pounds of ground barley grain. The ground grain was mixed with 40 gallons of tap water at 45° C., and the pH of the mixture was adjusted to about 6.7 with 15% sodium hydroxide.

70 grams of papain (described inn Example 1) and 70 grams of potassium metabisulfite were added to the mixture, and the mixture was stirred at 45° C. for one hour. Approximately 10 gallons of cold tap water was added to the mixture, reducing its temperature to 25° C. The mixture was allowed to stand for two hours at 25° C., at which time the clear supernatant liquid was removed by siphoning.

The supernatant liquid was mixed with H.T. Proteolytic enzyme (described in Example 1) at a rate of 0.2 gram per liter, and the mixture was stirred for two hours at 45° C. The resulting solution was concentrated at 50–55° C. under a vacuum of 27 inches of mercury, to produce a protein hydrolysate concentrate containing 53.5% solids. The protein content was 46.4% by weight of the solids.

A 400 gram portion of the hydrolysate concentrate was blended by hand with 1500 grams of finely granulated glucose, producing a granular mixture containing 16.8% water. (Glucose as referred to in the examples herein is in the form of the monohydrate, about 91% anhydrose glucose.) The mixture was dried in a kiln with forced air at room temperature for about 15 minutes. The air then was heated at 82° C., and the bottom of the bed reached 82° C. in about 12 minutes. Circulation of air at 82° C. continued for an additional 30 minutes, during the last 20 minutes of which the bed temperature was 80° C. The mixture had a slight caramel aroma at this time, and the toasted material was removed from the kiln, spread on trays, and cooled by exposure to air at room temperature.

Low carbohydrate beers were produced from the toasted product. The beers had substantially greater beer-like quality than those from untoasted material, and there was no winey note. They were superior in flavor and aroma to prior commercial low carbohydrate beers. Two of the beers, identified as Nos. 1 and 2, were prepared as follows:

Beer No. 1 was prepared by dissolving 350 grams of toasted product in brewing water to make 5 liters. The resulting wort was then brought to boil and boiled for 2 hours with the addition of 7 grams of hops. After boiling, the hops were removed by straining, and the wort was cooled and adjusted to 8.3° Plato. The wort was pitched with brewers yeast at a rate of about 1 pound per barrel and fermented for about seven days at 12° C.

Beer No. 2 was prepared by dissolving 330 grams of toasted product and 30 grams of a malt extract prepared from redried distillers-type malt, in brewing water to make 5 liters. Processing of the resulting wort and fermentation followed the same schedule as for beer No. 1.

The malt extract used in the preparation of beer No. 2 was prepared from a gibberellic acid-treated, distillers-type malt produced as described in U.S. Pat. No. 3,116,221. The malt was dried for an additional 3 hours at 82° C. to approximate the degree of kilning ordinarily accorded a brewers-type malt. Analysis of this malt revealed a moisture content of 2.4% and a soluble protein level of 7.07%. The malt was ground to a standard brewers grind, and extracted using a standard brewing procedure. The malt was mixed with water and allowed to rest for 60 minutes at 38° C. The mixture was heated to 73° C. and held at such temperature for 30 minutes, for conversion. The mash was lautered at 75° C. After wort run-off, the collected wort was evaporated to produce a concentrate containing 65.3% solids, of which 7.0% by weight of the solids was protein.

The analyses of the worts and beers, Nos. 1 and 2, are shown in Table I.

A malt liquor type of beverage also was produced from the toasted mixture, as follows: 500 grams of the toasted product and 75 grams of Nu-Bru corn adjunct concentrate (Corn Products Sales Co., a sugar syrup produced by hydrolysis of corn starch after germ separation, having 81.4% solids containing 71.4% fermentable extract) were dissolved in brewing water to make 5 liters. The resulting wort was boiled for 2 hours with the addition of 12 grams of hops, followed by straining to remove the hops. The cooled wort was adjusted to 14.0° Plato with brewing water and fermented as described above. The analyses of the wort and beer are shown in Table I, identified as No. 3.

TABLE I

| Number | 1 | 2 | 3 |
|---|---|---|---|
| Wort: | | | |
| Color, ° L. (a.b.)[1] | 4.4 | 4.4 | 9.4 |
| pH (a.b.)[1] | 5.68 | 5.72 | 5.35 |
| Protein, percent | 0.48 | 0.50 | 0.72 |
| Beer: | | | |
| Real extract, percent | 1.227 | 1.306 | 4.177 |
| Alcohol, percent | 3.61 | 3.50 | 4.87 |
| R.D.F., percent [2] | 85.5 | 84.3 | 70.2 |
| Color, ° L | 3.6 | 3.6 | 7.9 |
| pH | 4.20 | 4.12 | 4.40 |
| Protein, percent | 0.39 | 0.38 | 0.57 |
| Foam stability, sigma | 112 | 129 | 130 |
| Total calories/12 oz.[3] | 106 | 105 | |
| Carbohydrate calories/oz.[4] | 1.00 | 1.11 | |

[1] After boil.
[2] Real degree of fermentation.
[3] Calculated using the formula: Calories/12 oz.=[4 × percent real extract) + (7 × percent alcohol)] × specific gravity × 3.548.
[4] Calculated based on 1.19 calories/oz./percent real extract carbohydrate.

Example 3

A portion of the protein hydrolysate concentrate of Example 2 was spray dried in a Niro Laboratory drier. The inlet air temperature was 175° C., and the outlet or exhaust air temperature was 70° C. The product contained 10.3% moisture.

A toasted product was prepared from the spray dried product and employed for the production of a normal bodied beer. A 55 gram portion of the spray dried product was dry-mixed with 55 grams of glucose and then mixed well with 4 grams of distilled water. The mixture was placed in a kiln, and forced air at 38° C. was passed through the mixture, for 10 minutes. The air temperature then was raised to 82° C., and forced air at such temperature was passed through the mixture for 30 minutes. The toasted product was removed from the kiln and cooled in the atmosphere to room temperature.

The toasted product, 480 grams of Nu-Bru corn adjunct concentrate (81.4% solids containing 71.4% fermentable extract), and 50 grams of glucose were dissolved in brewing water to make 5 liters. The wort was boiled, hopped with 9 grams of hops, cooled, adjusted to 12.3° Plato, and fermented with brewers yeast, in the manner of Example 2.

The beer brewed from the toasted product had excellent flavor and aroma. The beer was very smooth and full bodied, comparable to a premium beer. Beer analytical characteristics were normal. Analyses of the wort and beer are shown in Table II.

TABLE II

Wort:
  Color, ° L. (a.b.) _____ 3.0
  pH (a.b.) _____ 5.55
  Protein, percent _____ 0.40
Beer:
  Real extract, percent _____ 4.59
  Alcohol, percent _____ 3.65
  R.D.F., percent _____ 63.3
  Color, ° L. _____ 2.0
  Protein, percent _____ 0.24
  Foam stability, sigma _____ 89
  pH _____ 3.83

Example 4

A protein hydrolysate concentrate containing 56.6% solids having a protein content of 49.7% was produced from barley whole grain in the manner of Example 2. A 400 gram portion of the concentrate was blended by hand with 1800 grams of granulated cane sugar (sucrose, containing about 0.5% moisture), producing a moist granular mixture. The mixture was dried in a kiln with forced air at 38° C. for 30 minutes. After breaking up agglomerates, air at 82° C. was passed through the mixture for 45 minutes, at which time the mixture had a very slight caramel taste. The mixture was cooled in the atmosphere to room temperature. The moisture content was 3.9% by weight of the mixture.

The toasted product was added to brewing water to make 4.2 liters, and was boiled for 2 hours with the addition of 9 grams of hops. The resulting wort was cooled to 20° C., adjusted to 8.5° Plato with brewing water, pitched with brewers yeast, and fermented at 12° C. for 7 days. The analyses of the wort and beer are shown in Table III.

TABLE III

Wort:
  Color, ° L. (a.b.) _____ 4.3
  pH (a.b.) _____ 5.75
  Protein, percent _____ 0.39
Beer:
  Real extract, percent _____ 1.21
  Alcohol, percent _____ 3.50
  R.D.F., percent _____ 85.0
  Color, ° L. _____ 2.8
  pH _____ 4.15
  Protein, percent _____ 0.28
  Foam stability, sigma _____ 62

Example 5

The protein hydrolysate concentrate of Example 4 and a toasted product prepared therefrom were blended in fermentation worts and brewed for the production of low carbohydrate and normal bodied beers. In this instance, the toasted product was toasted to a greater extent than when intended for use as the sole protein source in a fermentation wort, in order to augment the organoleptic properties of the untreated concentrate portions of the worts.

The toasted product was made by blending 800 gm. of the concentrate with 3000 gm. of glucose, producing a moist granular mixture. The mixture was dried and toasted in a kiln with forced air at the following temperatures for the indicated periods of time: room temperature, 1 hr.; 38° C., 1 hr.; 49° C., 1 hr.; 65° C., 30 min.; and 82° C., 55 min. The mixture then was cooled in the kiln with air at room temperature.

A wort for a low carbohydrate beer (No. 1) was prepared from 125 gm. of toasted product, 35 gm. of protein hydrolysate concentrate, 225 gm. of glucose, and brewing water to make 5 liters. Boiling and hopping were conducted, the wort was adjusted to 8.3° Plato, and the wort was fermented, in the manner of Example 2. The beer stood overnight at 0° C. and then was filtered, carbonated, and bottled.

A wort for a normal bodied beer (No. 2) was prepared from 125 gm. of toasted product, 60 gm. of protein hydrolysate concentrate, 550 gm. of Nu-Bru corn adjunct concentrate (81.4% solids containing 71.4% fermentable extract), and brewing water to make 5 liters. The wort was processed as described above for beer No. 1, except that the wort was adjusted to 12.3° Plato for fermentation.

The flavor qualities of the beers were very good, and the analytical characteristics of both beers were normal. The analyses of the worts and beers are shown in Table IV.

TABLE IV

| Number | 1 | 2 |
|---|---|---|
| Wort: | | |
| Color, ° L (a.b.) | 5.5 | 5.4 |
| pH (a.b.) | 5.25 | 5.30 |
| Protein, percent | 0.35 | 0.43 |
| Beer: | | |
| Real extract, percent | 1.13 | 4.79 |
| Alcohol, percent | 3.49 | 3.69 |
| R.D.F., percent | 86.3 | 60.7 |
| Color, ° L | 4.0 | 4.1 |
| Protein, percent | 0.24 | 0.29 |
| Foam stability, sigma | 91 | 102 |
| pH | 3.93 | 3.95 |
| Total calories 12 oz | 103 | |
| Carbohydrate calories/oz | 1.06 | |

Example 6

A 2,000 gram quantity (dry basis) of northern-grown hard winter wheat was ground on a Labconco Mill at a setting of 1.5 (99.5% particles less than 1 mm. diameter). The product was mixed with 10 liters of water, including 9 liters of cold tap water and 1 liter of brewing water. The pH of the mixture was adjusted to 7 by the addition of 15 ml. of 15% sodium hydroxide.

To the mixture was added 5 grams of papain (as described in Example 1) and 6 grams of potassium metabisulfite, and the mixture was stirred for 4 hours at 45° C. To the mixture was added 5 liters of cold tap water, and the mixture was held at 0° C. overnight.

Approximately 9 liters of liquid extract then was removed by siphoning the supernatant liquid. The extract was treated with 0.2 gram per liter of HT Proteolytic enzyme (as described in Example 1) at 45° C. with stirring for 3 hours. The resulting hydrolysate solution contained 2.3% solids, including 1.38% protein. It had a pH of 4.3.

The hydrolysate solution was concentrated in a circulating evaporator, in the manner of Example 1. The concentrated solution contained 60.5% solids by weight, and the protein content was 61.6% by weight of the solids.

A 76 gram portion of the protein hydrolysate concentrate was blended by hand with 315 grams of finely granulated glucose, producing a moist granular mixture. The mixture was dried in a kiln with forced air at room temperature for 75 minutes, and then with air at 38° C., for 30 minutes. After breaking up agglomerates, air at 82° C. was passed through the mixture for 45 minutes. At this time, the toasted mixture had the desired very slight caramel taste, and was air cooled to room temperature.

A fermentation wort for a low carbohydrate beer was prepared with the toasted product, by diluting the product with brewing water to a total volume of 5 liters. The wort was boiled for 2 hours with the addition of hops, strained, cooled, and adjusted to 8.0° Plato with brewing water. The wort then was pitched with yeast and fermented for 7 days at 12° C. Following fermentation, the beer was stored for 24 hours at 0° C., filtered, carbonated, and bottled.

The toasted product produced a good beer, having a well balanced flavor with a caramel aroma and taste, at least equivalent to commercial low carbohydrate beers. A beer comparatively produced from an untoasted mixture of protein hydrolysate concentrate and glucose, while an acceptable beverage, had a slightly sour aroma and was tart. The analyses of the wort and beer from the toasted product are shown in Table V.

TABLE V

Wort:
- Color, ° L. (a.b.) _____ 10.2
- pH (a.b.) _____ 4.45
- Protein, percent _____ 0.52

Beer:
- Real extract, percent _____ 1.42
- Alcohol, percent _____ 3.40
- R.D.F., percent _____ 82.6
- Color, ° L. _____ 8.5
- Protein, percent _____ 0.50
- Foam stability, sigma _____ 136
- pH _____ 4.05
- Total calories/12 oz. _____ 104
- Carbohydrate calories/oz. _____ 1.09

Example 7

Soy flour containing 53.5% protein, dry basis, and 7.74% moisture (Staley extracted soy flour I–200) was subjected to hydrolysis with proteolytic enzyme. A 1,100 gram quantity of the soy flour was admixed with 5½ liters of tap water and ½ liter of brewing water at 45° C. To the mixture was added 2.5 grams of papain (as described in Example 1) and 2 grams of potassium metabisulfite. The mixture was stirred for 1 hour at 45° C., and then was stored overnight at 0° C. The mixture was separated by centrifugation, and the separated solution was concentrated on a circulating evaporator, as described in Example 1. The resulting protein hydrolysate concentrate contained 46.9% solids, of which 61.8% was protein.

A 150 gram quantity of the concentrate was blended with 600 grams of glucose, and the mixture was spread on a tray and let stand overnight at room temperature to reduce moisture. The mixture was dried in a kiln with forced air at 38° C. for 30 minutes, and then was heated with air at 82° C. for 30 minutes. The toasted product was removed from the kiln and allowed to cool in the atmosphere to room temperature. The moisture content of the product was 2.2%.

Fermentation worts were prepared with the protein hydrolysate concentrate and with the toasted product. A 75 gram quantity of the concentrate was mixed with 300 grams of glucose and made up to 5 liters with brewing water. A 350 gram quantity of the toasted product was made up to 5 liters with brewing water.

Each of the resulting worts was boiled for 1½ hours, and was hopped by the addition of 2 grams of hops at the start of boiling, 2 grams after 45 minutes of boiling, and 5 grams after 70 minutes of boiling. The worts were cooled, adjusted to 8° Plato with brewing water, pitched with brewers yeast, and fermented at 12° C. for 7 days. The fermented worts then were cooled at 0° C. for 24 hours to settle yeast, and were filtered, carbonated, and bottled.

The beer produced from the protein hydrolysate concentrate, identified as No. 1, had a grainy aroma and harsh flavor. The beer produced from the toasted product, identified as No. 2, was quite palatable, having a fresh aroma and a smooth, slightly caramel flavor, much smoother than beer No. 1. The analyses of the worts and beers are shown in Table VI.

TABLE VI

| Number | 1 | 2 |
|---|---|---|
| Wort: | | |
| Color, ° L. (a.b.) | 1.0 | 1.5 |
| pH (a.b.) | 5.70 | 5.40 |
| Protein, percent | 0.31 | 0.31 |
| Beer: | | |
| Real extract, percent | 1.05 | 1.60 |
| Alcohol, percent | 3.45 | 3.25 |
| R.D.F., percent | 86.7 | 80.1 |
| Color, ° L. | 0.4 | 0.8 |
| pH | 4.25 | 4.32 |
| Protein, percent | 0.15 | 0.17 |
| Foam stability, sigma | 120 | 113 |

Example 8

Technical grade enzyme-hydrolyzed casein was employed for brewing, both in the form of the hydrolysate, and as the product of toasting a mixture of the hydrolysate and glucose. The hydrolysate was produced by the pancreatic digestion of casein and spray drying, and was identified as Amber EHC (Amber Laboratories). It contained 13.5% total nitrogen, equivalent to 84.28% protein, and amino nitrogen equal to 30% of the total nitrogen.

A 23 gram portion of the protein hydrolysate was mixed with 350 grams of glucose and 40 ml. of tap water. The mixture was spread on a tray and allowed to stand overnight at room temperature to reduce moisture. The mixture was placed in a kiln and dried with forced air at a temperature of 38° C. for 30 minutes, and then was heated with air at 82° C. for 30 minutes, followed by removal from the kiln and cooling in the atmosphere to room temperature.

A 23 gram portion of the protein hydrolysate was mixed with 350 grams of glucose and made up to 5 liters by the addition of brewing water. The foregoing toasted product was made up to 5 liters by the addition of brewing water. The resulting worts were boiled, hopped, adjusted to 8.3° Plato, fermented and finished as described in Example 7.

The beer brewed from the protein hydrolysate, identified as No. 1, had a rather grainy flavor and a sour aroma which became skunky on aging for about 2 months. The beer brewed from the toasted product, identified as No. 2, had a pleasant beer-like flavor with a slight caramel note, and a winey aroma reminiscent of apple juice, which diminished to result in a light beery aroma upon aging for the same length of time. The analyses of the worts and beers are shown in Table VII.

TABLE VII

| Number | 1 | 2 |
|---|---|---|
| Wort: | | |
| Color, ° L. (a.b.) | 2.3 | 5.5 |
| pH (a.b.) | 5.60 | 5.60 |
| Protein, percent | 0.49 | 0.46 |
| Beer: | | |
| Real extract, percent | 2.18 | 2.05 |
| Alcohol, percent | 3.04 | 3.10 |
| R.D.F., percent | 74.3 | 75.3 |
| Color, ° L. | 1.4 | 4.4 |
| pH | 3.82 | 3.72 |
| Protein, percent | 0.40 | 0.34 |
| Foam stability, sigma | 32 | 52 |

Example 9

A 1000 gram portion of the protein hydrolysate concentrate of Example 4 was blended with 3150 grams of finely granulated glucose. The mixture was dried and toasted as described in Example 2, extending the heating period to 4 hours with air at 82° C. The somewhat chunky product was reduced to a powder in a blender. The toasted product generally was slightly darker, having more of a light tan color than the product normally preferred for brewing.

A malted milk beverage is prepared by blending the following mixture for about 30 seconds prior to pouring into glasses for consumption:

|  | G. |
|---|---|
| Toasted product | 50 |
| Milk | 350 |
| Vanilla ice cream | 300 |
| Chocolate syrup | 15 |

The beverage has better aftertaste characteristics and less of the grainy qualities normally associated with commercial malted milk products.

A malt-flavored soft drink is prepared by dissolving 300 grams of toasted product in 4 liters of distilled water and filtering through a Sparkler filter. The filtrate is carbonated for 1½ hours at 25 p.s.i.g., and then is bottled and pasteurized. The beverage has a definite malty quality to the flavor and aroma, with none of the "wet wool" type of aroma.

Other flavors are readily superimposed on the foregoing basic soft drink formula. The following compositions are used to make lime and chocolate flavored drinks, by the foregoing procedure:

150 g. toasted product
2 l. distilled water
78 g. real-lime reconstituted lime juice, food coloring to furnish yellow-green coloration
150 g. toasted product
2 l. distilled water
175 g. Hershey's chocolate syrup The first composition provides a beverage having a distinct lime flavor with a malty background note. The second composition provides a chocolate and malt-flavored beverage.

We claim:

1. A process for producing a protein hydrolysate of enhanced organoleptic properties which comprises
   treating a starchy proteinaceous raw cereal grain product in aqueous medium with added proteolytic enzyme in the absence of substantial added amylolytic enzyme at about 35–50° C. and for a time period of about ½–6 hours to produce a solution containing soluble protein hydrolysis products together with a starchy carbohydrate fraction, said solution containing at least about 40% protein by weight of the solids content thereof,
   separating said solution from undissolved grain product residue without further heating, thereby preventing further extraction of grain carbohydrate in said residue,
   treating the separated solution with added amylolytic enzyme at about 37–75° C. and for a time period of about ½–6 hours to produce a concentrated protein hydrolysate substantially free of starch,
   intimately mixing the protein hydrolysate and an added sugar in the presence of sufficient water in the range of about 10–25% by weight to provide a moist granular mixture, the weight ratio of sugar to protein in said mixture being at least about 2:1,
   drying said mixture to remove surface moisture and yield a moisture content of about 7–20% by weight, and
   heating said mixture at a temperature of about 75–100° C. for about 20 minutes to 4 hours until a caramel flavor is imparted to the mixture.

2. A process as defined in claim 1 wherein said sugar is selected from the group consisting of glucose and sucrose.

3. A process as defined in claim 2 wherein said grain product is barley whole grain.

4. A process as defined in claim 1 wherein said mixture is heated at about 80–85° C. to yield a moisture content of about 2–10% by weight, whereupon the mixture is cooled to a maximum temperature of about 38° C., thereby producing a free-flowing granular product.

5. A process as defined in claim 4 wherein said grain product is barley whole grain, and said sugar is selected from the group consisting of glucose and sucrose.

6. A protein hydrolysate of enhanced malt-like organoleptic properties and a low content of unfermentable carbohydrates prepared in accordance with the process of claim 2.

7. In a process for producing a low carbohydrate fermented alcoholic beverage, the step of incorporating in a fermentation wort the product of the process of claim 2 to supply at least a substantial proportion of the protein requirements for the beverage, for providing a wort low in unfermentable carbohydrates.

8. In a process for producing a non-alcoholic beverage, the step of incorporating in the beverage the product of the process of claim 5 as a malt flavor base.

9. A process as defined in claim 1 wherein said mixture is heated by conducting hot air therethrough.

References Cited

UNITED STATES PATENTS

| 3,480,447 | 11/1969 | Hack et al. | 99—140 |
| 3,157,513 | 11/1964 | Allen et al. | 99—17 |
| 2,692,199 | 10/1954 | Weber | 99—42 |

OTHER REFERENCES

White et al.: Caramel—The Neglected Colloid, Amer. Bremer, vol. 83, No. 12, 1950 (pp. 29–31 and 57).

Schultz et al.: The Chemistry and Physiology of Flavors, The Avi Publishing Co., Inc., Westport, Conn., 1967 (pp. 474–479).

Kamada et al.: Production of Caramel, by Maillard Reaction, Chemical Abstracts, November 1963 (p. 962).

JOSEPH M. GOLIAN, Primary Examiner

D. M. NAFF, Assistant Examiner

U.S. Cl. X.R.

99—17, 31, 50, 53, 140 R